(12) United States Patent
Swallow

(10) Patent No.: US 8,718,060 B2
(45) Date of Patent: May 6, 2014

(54) TECHNIQUE FOR MULTIPLE PATH FORWARDING OF LABEL-SWITCHED DATA TRAFFIC

(75) Inventor: George Swallow, Boston, MA (US)

(73) Assignee: Cisco Technology, Inc., San Jose, CA (US)

( * ) Notice: Subject to any disclaimer, the term of this patent is extended or adjusted under 35 U.S.C. 154(b) by 699 days.

(21) Appl. No.: 11/496,256

(22) Filed: Jul. 31, 2006

(65) Prior Publication Data

US 2008/0025309 A1   Jan. 31, 2008

(51) Int. Cl.
   *H04L 12/56* (2011.01)
(52) U.S. Cl.
   USPC .......................... 370/392; 370/352; 370/386
(58) Field of Classification Search
   USPC .......................................... 370/392, 352, 389
   See application file for complete search history.

(56) References Cited

U.S. PATENT DOCUMENTS

| | | | | |
|---|---|---|---|---|
| 6,724,722 | B1 * | 4/2004 | Wang et al. | 370/229 |
| 6,751,190 | B1 | 6/2004 | Swallow | |
| 6,925,081 | B2 | 8/2005 | Meda | |
| 7,082,102 | B1 | 7/2006 | Wright | |
| 7,212,526 | B2 * | 5/2007 | Kanetake | 370/386 |
| 7,568,047 | B1 * | 7/2009 | Aysan et al. | 709/238 |
| 2006/0039364 | A1 * | 2/2006 | Wright | 370/352 |
| 2006/0056384 | A1 * | 3/2006 | Ishii et al. | 370/351 |
| 2006/0182035 | A1 * | 8/2006 | Vasseur | 370/238 |

OTHER PUBLICATIONS

Iselt, A., et al., "Resilient Routing Using MPLS and ECMP," 2004 IEEE Workshop on High-Performance Switching and Routing (HPSR 2004), Phoenix, AZ, Apr. 18-21.

Swallow, G., et al., "Avoiding Equal Cost Multipath Treatment in MPLS Networks," Internet Draft, www.ietf.org/internet-drafts/draft-ietf-mpls-ecmp-bcp-02.txt pp.1-8 (Sep. 2005).
Rosen, E., et al., "Multiprotocol Label Switching Architecture," RFC 3031, pp. 1-61 (Jan. 2001).
Swallow, G., et al., "Avoiding Equal Cost Multipath Treatment in MPLS Networks," Internet Draft, www.ietf.org/draft-ietf-mpls-exmp-bcp-000.txt pp. 1-7 (Sep. 2004).
Swallow, G., et al., "Avoiding Equal Cost Multipath Treatment in MPLS Networks," Internet Draft, www.ietf.org/draft-ietf-mpls-ecmp-bcp-01.txt pp. 1-9 (Jul. 2005).
Mar. 26, 2009, Notification Concerning Transmittal of International Preliminary Report on Patentability (Chapter I of the PCT), PCT/US2007/016995.
Office Action dated May 9, 2012, in counterpart European Application No. 07810896.6.

(Continued)

*Primary Examiner* — Dang Ton
*Assistant Examiner* — Pamit Kaur

(57) ABSTRACT

A technique for multiple path forwarding of label-switched data traffic in a communication network across multiple paths such that traffic associated with a particular label-switched path (LSP) is forwarded on the same path in the network. An incoming label associated with a packet is used to select an Equal Cost Multiple Path (ECMP) technique that is used to identify an interface among a plurality of interfaces on which the packet may be forwarded. An incoming label associated with the packet is used to identify an outgoing label for the packet as well as the plurality of interfaces on which the packet may be forwarded. A label in the packet's label stack is hashed to produce a hash value. The hash value is then used to identify an interface from the plurality of interfaces on which the packet is forwarded. The outgoing label is placed in the packet and the packet is forwarded on the identified interface.

13 Claims, 6 Drawing Sheets

(56) References Cited

OTHER PUBLICATIONS

Dave Allen, Nortel Networks, "Alternative mechanism to distinguish OAM PDUs," ITU-T Draft Study Period 2001-2004, International Telecommunication Union, Geneva, Jul. 21, 2003.

Martini, et al., "Encapsulation Methods for Transport of ATM Over MPLS Networks," Internet Engineering Task Force, Internet Draft, May 2006.

Extended European Search Report and European Search Opinion in counterpart European Application No. 07810896.6, dated Sep. 9, 2011.

* cited by examiner

TECHNIQUE FOR MULTIPLE PATH FORWARDING OF LABEL-SWITCHED DATA TRAFFIC

BACKGROUND

A communication network is a geographically distributed collection of nodes interconnected by communication links and segments for transporting communications (e.g., data, voice, video) between communication units (end nodes), such as personal computers, certain telephones, personal digital assistants (PDAs), video units and the like. Many types of communication networks are available, with the types ranging from local area networks (LANs) to wide area networks (WANs). LANs typically connect nodes over dedicated private communications links located in the same general geographical location, such as a building or campus. WANs, on the other hand, typically connect large numbers of geographically dispersed nodes over long-distance communications links, such as common carrier telephone lines. The Internet is an example of a WAN that connects networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol is a set of rules defining how the nodes interact with each other.

A communication network may comprise a series of intermediate nodes (e.g., routers) that are configured to carry communications through the network to the end nodes. A router is a type of intermediate node that is typically configured to "route" data, such as packets, between various nodes in the network. Routing is performed at layer-3 (L3), which is the network layer of the Open Systems Interconnection Reference Model (OSI-RM).

Routers often maintain forwarding information bases (FIBs) which are typically configured to hold routing information (e.g., L3 addresses) and interface information that the router uses to determine how to forward the data in order to reach its destination. A typical FIB is a data structure organized as a table containing one or more entries wherein each entry contains an L3 destination address of a destination node and interface information about an interface on the router through which the destination node may be reached. Data (e.g., a data packet) containing a destination address that matches a destination address of an entry in the FIB are forwarded by the router to the interface specified by the matching entry for transfer on a path to the destination node.

A router may execute one or more routing protocols that enable the router to route packets and exchange routing information with other routers in the network. The routers often use this information to configure (e.g., compute) their FIBs. The routing protocols may include distance-vector protocols, such as the Routing Information Protocol (RIP), or link-state protocols, such as the Intermediate-System-to-Intermediate-System (IS-IS) protocol and the Open Shortest Path First (OSPF) protocol.

Routing information is typically exchanged between the routers in the form of advertisement messages. For example, nodes executing the IS-IS protocol exchange routing information using an advertisement message called a Link State Packet (LSP). Likewise, nodes executing the OSPF protocol exchange routing information using an advertisement message called a Link State Advertisement (LSA). A router that acquires an advertisement message may use information contained therein to update its FIB.

Some communication networks employ Multiprotocol Label Switching (MPLS) technology to deliver data packets across a communication network along paths from sources to destinations. MPLS is a well-known technology that provides for the efficient designation, routing, forwarding and switching of flows of traffic (data flows) through a communication network. Data traffic associated with the flows is carried through the network via paths called label-switched paths (LSPs). An LSP is a path in a communication network that is defined by a sequence of labels at each and every node along the path from a source to a destination. LSPs may be established prior to data transmission or upon detection of a certain flow of data. MPLS is described in E. Rosen, et al., Request for Comments (RFC) 3031, "Multiprotocol Label Switching Architecture," Internet Engineering Task Force (IETF), January 2001, pages 1-61.

Networks that support MPLS are often referred to as MPLS networks. In an MPLS network, MPLS packets are typically processed by special routers called label switching routers (LSRs) and label edge routers (LERs). Both LSRs and LERs participate in the establishment of LSPs as well as the high-speed switching of data traffic based on the established LSPs. LERs are routers which operate at the edge of an MPLS network and provide access to the network. LSRs are often high-speed routers that comprise the core of MPLS networks and switch MPLS packets along paths between the LERs.

MPLS uses labels which determine how the traffic is switched (forwarded) along an LSP. The labels typically reside between the layer-2 (L2) and L3 headers of MPLS packets. A label typically comprises a label field, an experimental field, an "S" field and a time to live (TTL) field. The label field holds the value of the label. The experimental field holds a value that is reserved for experimental use. In some MPLS implementations, this field holds a value that represents a class-of-service (CoS) associated with the label. The "S" field holds a value that indicates whether or not the label is at the bottom of a stack of labels (described further below) that are contained in the MPLS packet. The TTL field indicates a "time-to-live" value associated with the label.

An MPLS packet contains a stack of one or more labels which is sometimes referred to as the packet's MPLS label stack. An MPLS label stack comprises a bottom label and optionally one or more additional labels. The "S" bit for the bottom label is typically set to a value of one to indicate the label is at the bottom of the stack. The "S" bits for the additional labels are typically set to zero to indicate these labels are not at the bottom of the stack.

Each label in an MPLS packet is associated with a forwarding equivalence class (FEC). An FEC indicates how a packet is treated with regards to being forwarded. Packets associated with the same FEC are generally treated the same with regard to forwarding the packets to their destination. In other words, an FEC describes a set of packets which may be forwarded the same way; that is, they may be bound to the same MPLS label.

Labels are usually only significant at a particular local node. Thus, for a particular FEC, the label associated with the FEC may be different at different nodes. For example, a node may associate a label value of "45" to a particular FEC whereas another node may associate a label value of "52" with the same FEC.

As noted above, LSPs are configured to carry data flows of traffic. A data flow refers to a flow of data (e.g., data packets) that travels from a particular source to a particular destination. Data packets that comprise a data flow typically have the same source and same destination addresses. In MPLS, a data flow travels on an LSP hop-by-hop through the network. At each node along the LSP, the top label on the MPLS label stack of an MPLS packet is typically used to determine which path the packet takes to the next hop along the LSP.

In some instances, there may be two paths that packets belonging to different flows may take to reach the next hop. Here, a load balancing technique may be employed to "load balance" the traffic from various data flows across the two paths. One commonly used technique for balancing MPLS traffic across multiple paths is the IP Equal Cost Multiple Path (ECMP) load balancing technique.

IP ECMP is geared towards load balancing IP-type packets that belong to multiple flows that may take multiple paths to their next hop. Load balancing is typically accomplished by selecting one of the paths based on a source and destination address contained in the packet and forwarding the packet on the selected path. In a typical IP ECMP implementation, the selected path is chosen by hashing some combination of source address and destination address bits contained in a packet's IP header which is typically contained a payload portion of the packet when viewed at the data link layer. The path for the packet is then selected based on the results of the hash.

Some IP ECMP implementations check the traffic in an attempt to ensure it is indeed IP-based traffic before applying the IP ECMP technique. Here, the first nibble of the packet's network layer header is typically examined to determine if it contains a value of "4" or "6" which indicate the packet is an IP version 4 (IPv4)-type packet and an IP version 6 (IPv6)-type packet, respectively. If the packet contains either of these values in the first byte of the packet's network layer header, the packet is assumed to be an IP packet and IP ECMP is applied to determine the packet's path to its next hop.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
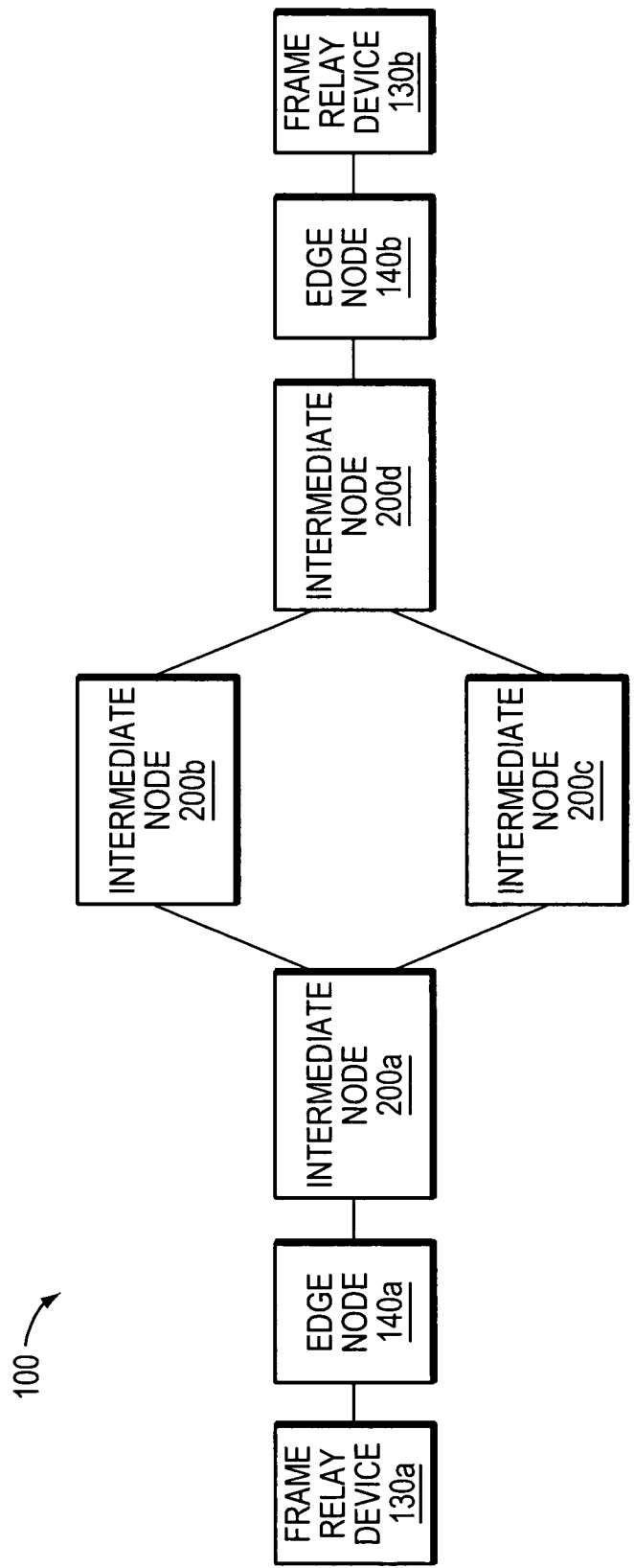
FIG. 1 is a block diagram of an exemplary communication network that may be used with the present invention.

A description of preferred embodiments of the invention follows.

It should be noted that illustrated embodiments of the invention, as described herein, are described as using the Multiprotocol Label Switching (MPLS) architecture to forward data traffic. A version of the MPLS architecture that may be used with the present invention is described in E. Rosen, et al., "Multiprotocol Label Switching Architecture," Request for Comments (RFC) 3031, January 2001, pp. 1-61, which is available from the Internet Engineering Task Force (IETF) and which is hereby incorporated by reference as though fully set forth herein. A version of the Equal Cost Multiple Path (ECMP) technique referenced herein is described in J. Moy, "OSPF Version 2," RFC 2328, April 1998, pp. 1-244 which is available from the IETF and which is hereby incorporated by reference in its entirety as though fully set forth herein. It should be noted that other data traffic forwarding architectures, load balancing techniques and label-switching protocols may be adapted to take advantage of the present invention.

One problem with the above-described Internet Protocol (IP) ECMP approach for load balancing MPLS traffic is that while it may handle IP-type traffic well it may not handle certain non-IP traffic very well. For example, non-IP data packets which may happen to have a value of "4" or "6" in their payloads at a position that is interpreted as a first nibble of an assumed network layer header may cause IP ECMP to be applied to select paths for the packets. This, in turn, may cause related packets to be forwarded on different paths to a destination. Forwarding related packets on different paths may cause the packets to arrive at their destination "out of order" or excessively jittered which may cause applications to fail.

The present invention overcomes these shortcomings by providing a technique related to load balancing label-switched traffic in a communication network across multiple paths such that traffic associated with a particular label-switched path (LSP) is forwarded on a single path through the network. According to an aspect of the technique, a new forwarding equivalence class (FEC) is defined which enables ECMP to be applied to packets regardless of whether they contain an IP header. The ECMP is applied to the packets based on an FEC associated with labels contained in the packets. The labels are used to select an ECMP technique from among a plurality of ECMP techniques that is used to identify the interface for the packet. Here, an ECMP technique may be established by semantics of an FEC associated with one or more labels used to select the ECMP technique.

The selected ECMP technique may be configured to identify an output interface for the data packet from information contained in a portion of the data packet other than a payload portion. For example, an MPLS label in a packet's MPLS label stack may be hashed to produce a hash value. The hash value may then be used to identify (select) an interface from a plurality of interfaces on which the packet is to be forwarded.

FIG. 1 is a block diagram of an exemplary communication network 100 that may be used with the present invention. Network 100 comprises frame relay devices 130, edge nodes 140 and intermediate nodes 200 coupled to form an internetwork of nodes. These internetworked nodes communicate by exchanging data packets according to a predefined set of network protocols, such as the MPLS protocol, Transmission Control Protocol/Internet Protocol (TCP/IP), frame relay (FR) and Ethernet.

The frame relay devices 130a-b are conventional frame relay devices configured to handle frame relay traffic. Data traffic flows from one frame relay device 130 through the network 100 to another frame relay device 130 as a series of MPLS packets which travel across the network 100 via labeled switch paths (LSPs).

The intermediate nodes 200a-d and edge nodes 140a-b are configured to form an MPLS network. Specifically, edge nodes 140a-b are conventional edge nodes (e.g., routers) configured to implement MPLS label switched edge routers (LERs). Likewise, intermediate nodes 200a-d are conventional intermediate nodes (e.g., routers) configured to implement MPLS label switched routers (LSRs). In addition, as will be described further below, intermediate nodes 200a-d are configured to load balance label switched traffic in accordance with aspects of the techniques described herein.

In network 100, each LSP comprises a series of labels and is bound to a particular forwarding equivalence class (FEC). Thus, each label associated with an LSP is bound to the LSP's FEC. Further in network 100, label, LSP and FEC information is illustratively defined by a user and distributed among the LERs and LSRs in the network 100 using, e.g., a distribution protocol, such as the well-known Label Distribution Protocol (LDP). A version of LDP that may be used with the present invention is described in L. Andersson, et al., "LDP Specification," RFC 3036, January 2001, pp. 1-132, which is available from the IETF and which is hereby incorporated by reference in its entirety as though fully set forth herein.

Figure 2:
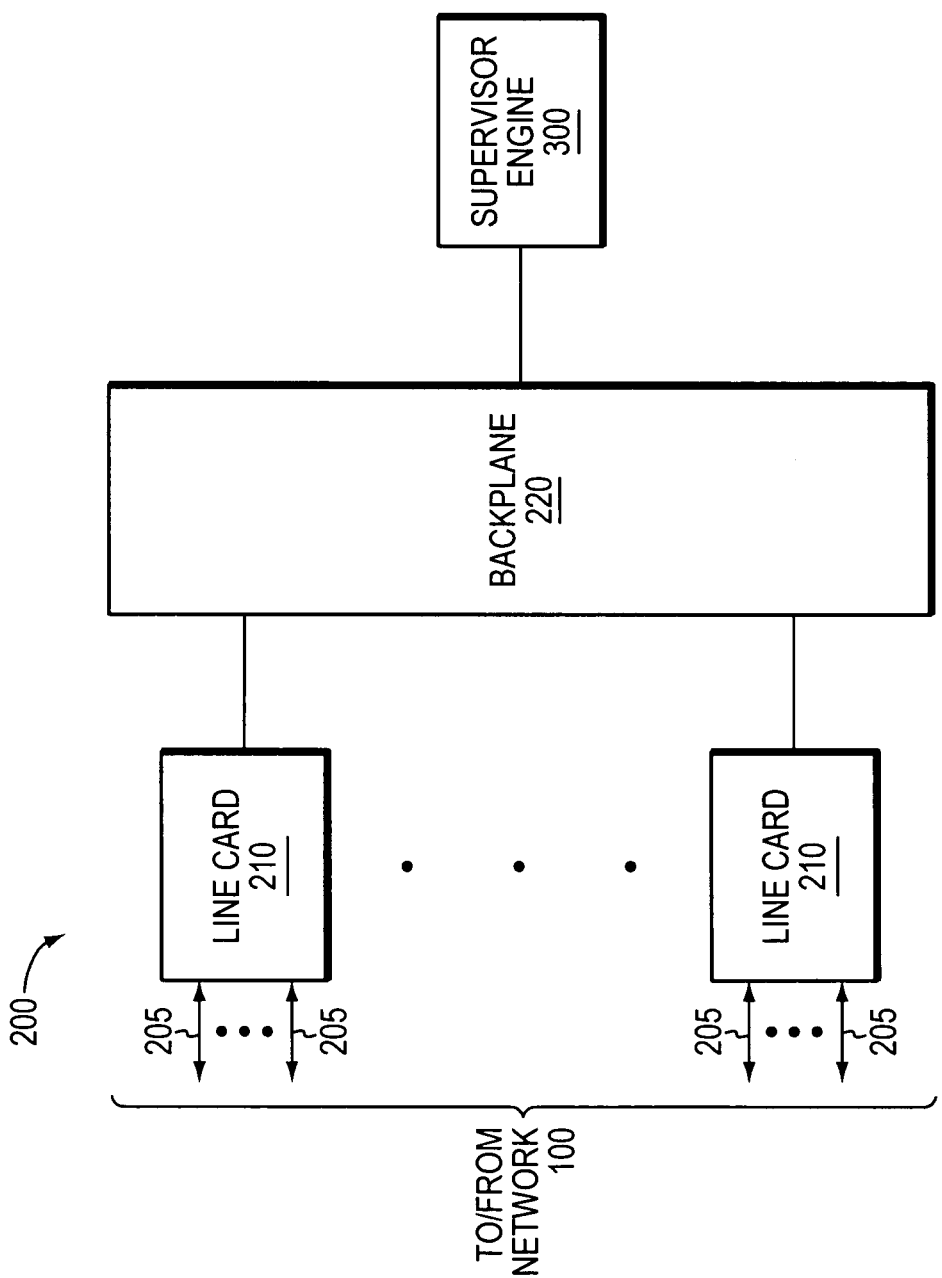
FIG. 2 is a block diagram of an intermediate node that may be used with the present invention.

FIG. 2 is a high-level block diagram of an intermediate node 200 that may be used with the present invention. Intermediate node 200 comprises one or more line cards 210 and a supervisor engine card 300 interconnected by a backplane 220. Node 200 is configured to perform various conventional layer-2 (L2) and layer-3 (L3) switching and routing functions. As used herein, L2 and L3 refer to the data link and network layers, respectively, of the Open Systems Interconnection Reference Model (OSI-RM). Node 200 may also be configured to support various combinations of protocols including, e.g., Open Shortest Path First (OSPF), Intermediate-System-to-Intermediate-System (IS-IS), TCP/IP, Ethernet, Asynchronous Transfer Mode (ATM) and FR. Suitable intermediate nodes that may be used with the present invention include the Cisco 7600 series routers available from Cisco Systems Incorporated, San Jose, Calif.

The backplane 220 comprises interconnections configured, e.g., as a bus that interconnects the various cards and allow data and signals to be transferred between the cards. The line cards 210 connect (interface) the intermediate node 200 with the network 100 and allow data packets to be transferred between the intermediate node 200 and the network 100 via physical ports 205 using various protocols, such as ATM, Ethernet and FR. To that end, the line cards 210 comprise conventional interface circuitry that incorporates signal, electrical, and mechanical characteristics, and interchange circuits, needed to interface with the physical media of the network 100 and protocols running over that media.

The line cards 210 also contain one or more network interfaces (not shown) which are illustratively logical entities that are associated with one or more physical ports 205. A packet received from the network 100 by a particular port 205 is associated with the port's network interface and is processed by the intermediate node 200 as if received by the network interface. Likewise, packets destined for the network 100 are associated with a network interface which is used to "route" the packets to particular physical ports 205 (associated with the network interface) for transfer onto the network 100. It should be noted that in other embodiments of the invention the network interfaces are physical entities that are configured to transfer packets onto the network.

Figure 3:
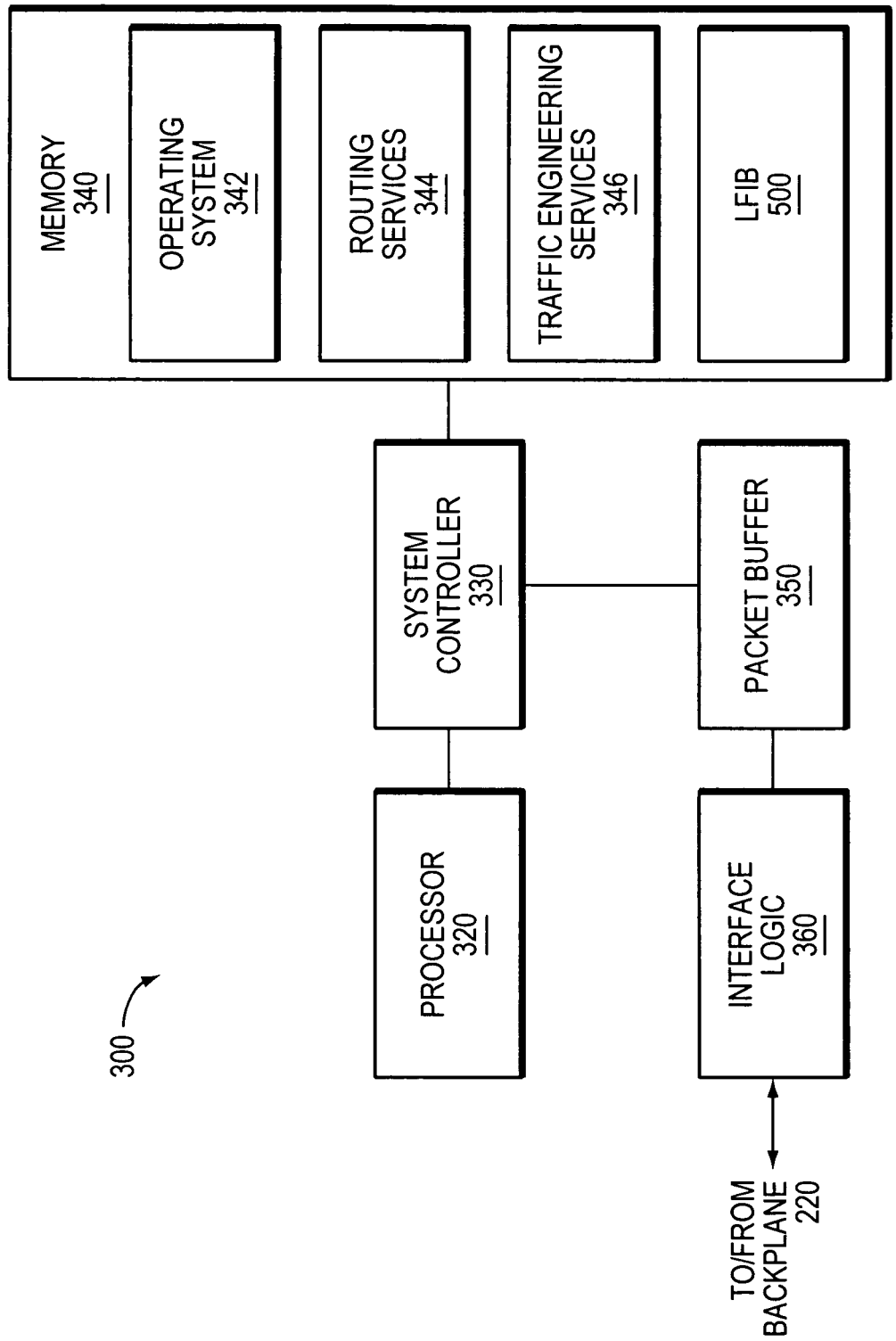
FIG. 3 is a block diagram of a supervisor engine that may be used with the present invention.

The supervisor engine 300 comprises logic configured to manage node 200, execute various protocols, such as MPLS, and perform other functions including, processing MPLS packets in accordance with aspects of the present invention. FIG. 3 is a high-level block diagram of supervisor engine 300 that may be used with the present invention.

Supervisor engine 300 comprises interface logic 360, packet buffer 350, system controller 330, processor 320 and memory 340. The interface logic 360 interfaces the supervisor engine 300 with the backplane 220 and enables data to be transferred between the backplane 220 and the supervisor engine 300. The packet buffer 350 is a memory comprising high-speed random access memory (RAM) devices capable of storing data packets (e.g., MPLS packets) acquired by the interface logic 360 and processed by the processor 320. System controller 330 is coupled to the processor 320, memory 340 and packet buffer 350, and comprises circuitry configured to enable the processor 320 to access (e.g., read, write) memory locations contained in the memory 340 and the packet buffer 350. Processor 320 comprises processing logic configured to implement a conventional central processing unit (CPU) which executes computer-excutable instructions and manipulates data contained in memory 340.

The memory 340 is a computer-readable medium comprising random-access memory (RAM) devices, such as dynamic RAM (DRAM) devices. Memory 340 contains computer-executable instructions and data structures used by the processor 320 including computer-executable instructions and data structures that implement aspects of the present invention. Specifically, memory 340 contains operating system 342, routing services 344, traffic engineering services 346 and label forwarding information base (LFIB) 500.

The operating system 342 is a conventional operating system that comprises computer-executable instructions and data configured to support the execution of processes (e.g., routing services 344, traffic engineering services 346) on processor 320. Specifically, operating system 342 is configured to perform various conventional operating system functions that, e.g., enable the processes to be scheduled for execution on the processor 320 as well as provide controlled access to various resources, such as memory 340. Routing services 344 is a software process that comprises computer-executable instructions and data which implement various routing protocols, such as OSPF and IS-IS. These functions may be configured to manage a FIB (not shown) containing, e.g., data used to make various forwarding decisions for packets processed by the supervisor engine 300. Traffic engineering services 346 is a software process that comprises computer-executable instructions and data which are configured to implement aspects of the MPLS architecture as well as determine paths for MPLS packets processed by node 200 in accordance with aspects of the present invention.

It should be noted that functions performed by intermediate node 200, including functions that implement aspects of the present invention, may be implemented in whole or in part using some combination of hardware and/or software. It should be further noted that computer-executable instructions and/or computer data that implement aspects of the present invention may be stored in other computer-readable mediums, such as volatile memories, non-volatile memories, flash memories, removable disks, non-removable disks and the like. In addition, it should be noted that various electromagnetic signals, such as wireless signals, electrical signals carried over a wire, optical signals carried over optical fiber and the like, may be encoded to carry computer-executable instructions and/or computer data that implement aspects of the present invention on, e.g., a communication network.

Figure 4:
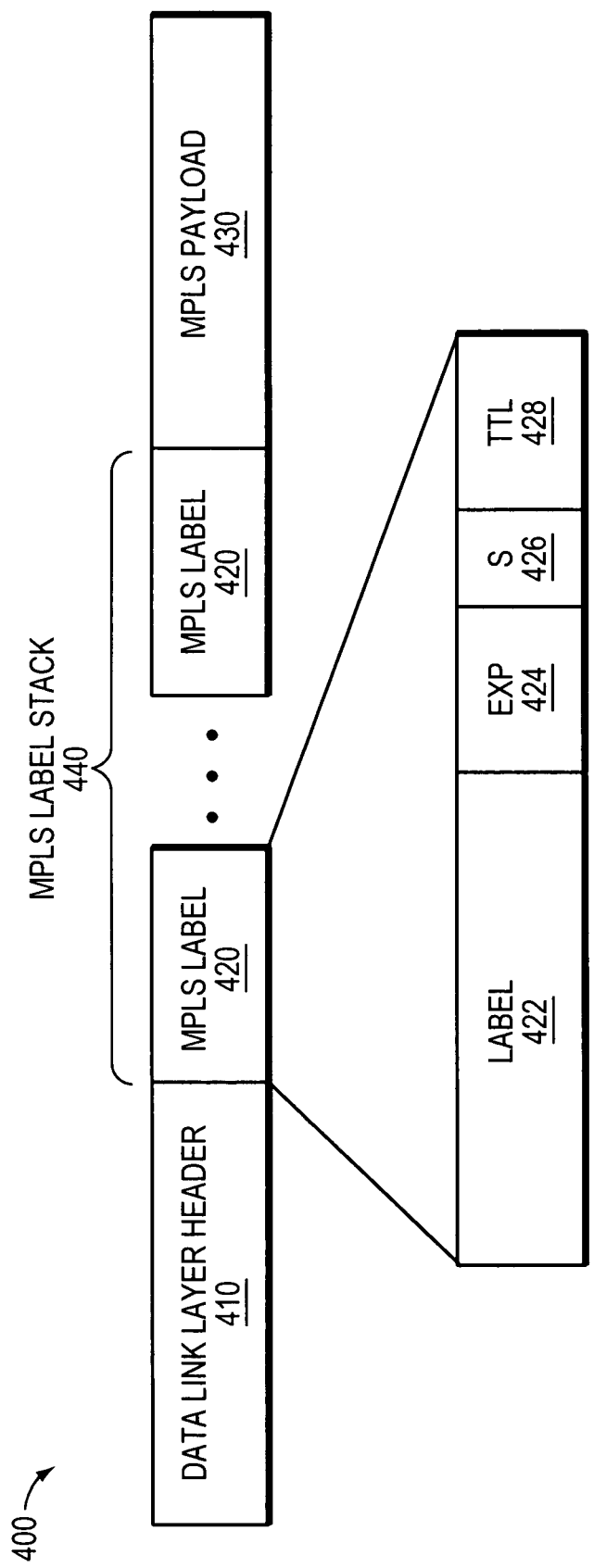
FIG. 4 is a block diagram of an exemplary Multiprotocol Label Switching (MPLS) data packet that may be used with the present invention.

FIG. 4 is a block diagram of an exemplary MPLS data packet 400 that may be used with the present invention. Packet 400 comprises a non-payload portion having a data link layer header 410, an MPLS stack 440 comprising one or more MPLS label entries 420 and a payload portion having an MPLS payload field 430. The data link layer header 410 holds a data link header (e.g., a header of an Ethernet packet). The payload field 430 holds payload data associated with the packet. This payload data may include a network layer header (e.g., an IP header).

Each MPLS label entry 420 further comprises a label field 422, an experimental (EXP) field 424, a "bottom of the stack" indicator ("S") field 426 and a time-to-live (TTL) field 428. The label field 422 holds a value that represents an MPLS label that is used for switching the packet along a path (LSP) in the communication network 100. The EXP field 424 holds experimental information. This field may be configured to hold a value that represents a class-of-service (CoS) associated with the label 422. The "S" field holds a value that indicates whether or not the entry 420 is at the bottom of the MPLS stack 440. Illustratively, a value of one in this field indicates the entry 420 is at the bottom of the MPLS stack 440 and a value of zero indicates that entry 420 is not at the bottom of the stack 440. The TTL field 428 holds a value that represents a time-to-live associated with the MPLS label entry 420.

The MPLS stack 440 is organized as having a bottom label 420 and, optionally, one or more additional label entries 420. In packet 400, the bottom label entry 420 immediately precedes the payload field 430. The additional label entries 420, if they exist, are positioned between the bottom label entry 420 and the data link layer header 410. A label 420 at the topmost portion of the stack 440 is considered the label 420 at the top of the stack 440.

Figure 5:
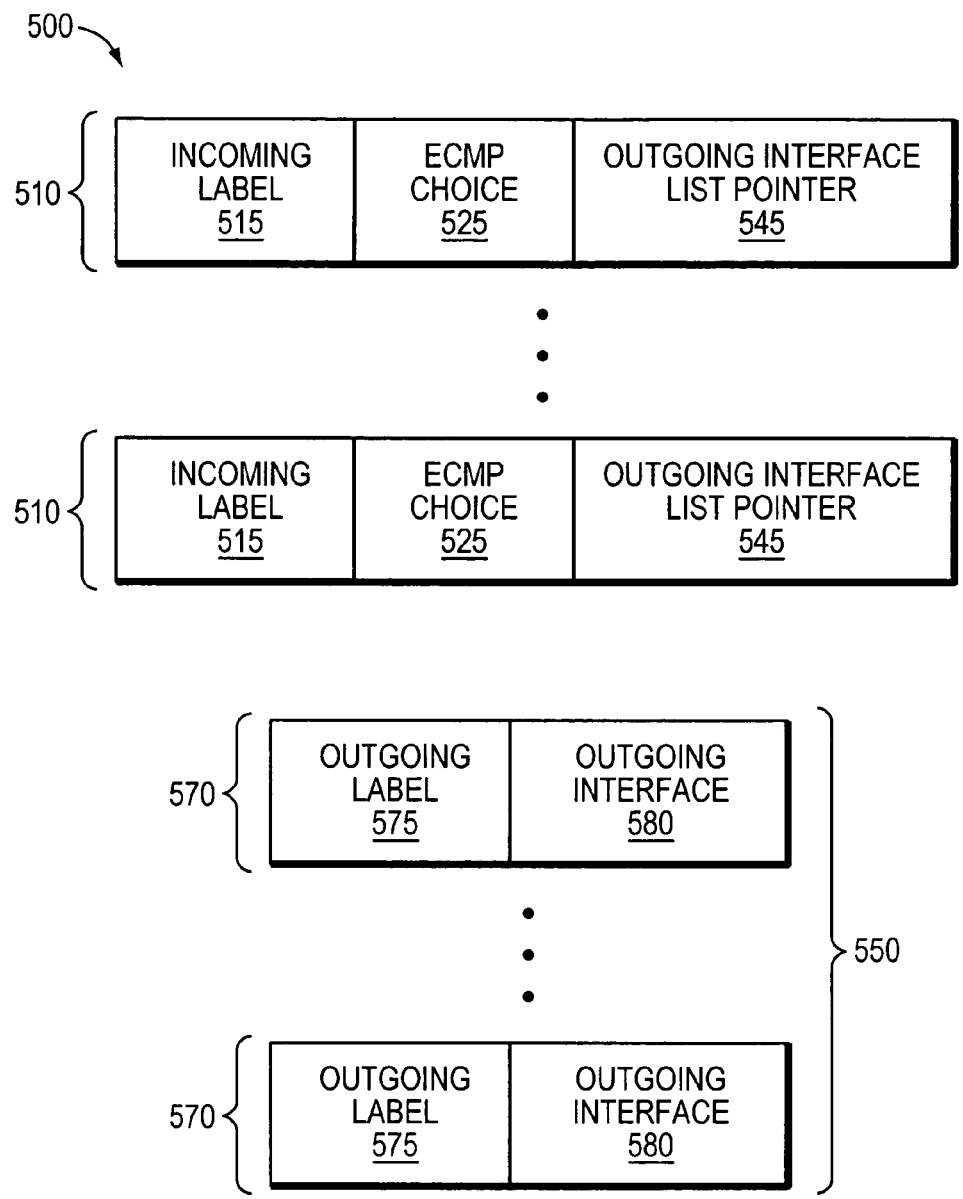
FIG. 5 is a block diagram of a label forwarding information base (LFIB) that may be used with the present invention.

The LFIB 500 is a data structure that contains information that is illustratively used to identify an interface for MPLS packets 400 processed by the intermediate node 200. FIG. 5 is a block diagram of an LFIB 500 that may be used with the present invention. LFIB 500 is illustratively organized as a table comprising one or more entries 510 wherein each entry 510 comprises an incoming label field 515, an ECMP choice field 525 and an outgoing interface list pointer field 545. Each entry 510 is "bound" to a particular FEC.

The incoming label field 515 holds a value that represents a label 422 contained in an MPLS label entry 420 of a packet's label stack 440. As will be described further below, the contents of the incoming label field 515 is used to associate an entry 510 with a packet 400 processed by the intermediate node 200. The ECMP choice field 525 holds a value that specifies an ECMP technique that is to be used to select an outgoing network interface for the packet 400. The ECMP technique may be one of a plurality of ECMP techniques that may be used to select outgoing network interfaces for packets processed in network 100. Moreover, the ECMP technique selected from among the plurality of techniques may be selected based on values of one or more labels contained in the label stack. Each technique may be established by semantics of one or more FECs associated with one or more labels used to select the ECMP technique. Illustratively, the ECMP technique that is represented in the choice field 525 is selected based on a value of the incoming label 515 and is established based on the semantics of an FEC associated with the label contained in incoming label 515. The outgoing interface list pointer 545 holds a value that points to an outgoing interface list 550.

Each outgoing interface list 550 is a data structure illustratively organized as a table configured to hold one or more entries 570. Each entry 570 contains an outgoing label field 575 and an outgoing interface field 580. The outgoing label 575 holds a value that represents a label 422 that is placed in an outgoing packet's label stack 440 to bind the packet 400 to the FEC bound to the entry 510 associated with the packet 400. The outgoing interface field 580 holds a value that represents a network interface that may be used to transfer the packet 400 to a next hop in the communication network 100.

Operationally, an MPLS data packet 400 received by the intermediate node 200 via a port 205 at a line card 210 is associated with the port's network interface. The packet 400 is transferred to the supervisor engine 300 which, inter alia, identifies an outgoing label and outgoing interface for the packet 400 by looking up an entry 510 associated with the data packet in the LFIB 500 and selecting an outgoing label and outgoing interface from information associated with the entry 510.

Illustratively, the label 422 in the topmost label entry 420 of the packet's label stack 440 is compared with incoming labels 515 of entries 510 in the LFIB 500 to locate an entry 510 whose incoming label 515 matches the packet's label 422. The outgoing interface list 550 associated with the matching entry 570 is examined to determine if it contains more than one entry 570. If the list 550 contains only one entry 570, that entry 570 is selected for the packet 400. Otherwise, if the list 550 contains a plurality of entries 570, the ECMP choice field 525 of the matching entry 510 is examined to determine how to generate a hash value that is used to select an entry 570 in the interface list 550 for the packet 400.

If the ECMP choice field 525 indicates that a conventional IP ECMP technique (e.g., as described in RFC 2328) is used to generate a hash value, the hash value is generated in accordance with the conventional IP ECMP technique (e.g., the hash value is generated from a source and destination address contained in the payload portion 430 of the packet 400). If the ECMP choice field 525 indicates that an ECMP technique other than the IP ECMP technique is to be applied to generate a hash value, information contained in a non-payload portion of the data packet (e.g., one or more labels in the packet's label stack 440) is used to generate the hash value.

Illustratively, a label 422 of an MPLS label entry 420 contained in the packet's stack 440 (e.g., the label 422 in the label entry 420 at the bottom of the stack) is hashed to generate the hash value. The generated hash value is used as an index into the interface list 550 to select an entry 570 for the packet 400.

The outgoing label 575 and outgoing network interface 580 of the selected entry 570 are then used as the identified outgoing label and identified outgoing network interface for the packet 400. Typically, the topmost label 422 of the packet's label stack 440 is replaced by the identified outgoing label 575 and the packet 400 is forwarded to the network interface represented in the identified outgoing interface 580 to transfer the packet to its next hop in the communication network 100. A port 205 associated with the network interface transfers the packet 400 onto the network 100.

Figure 6:
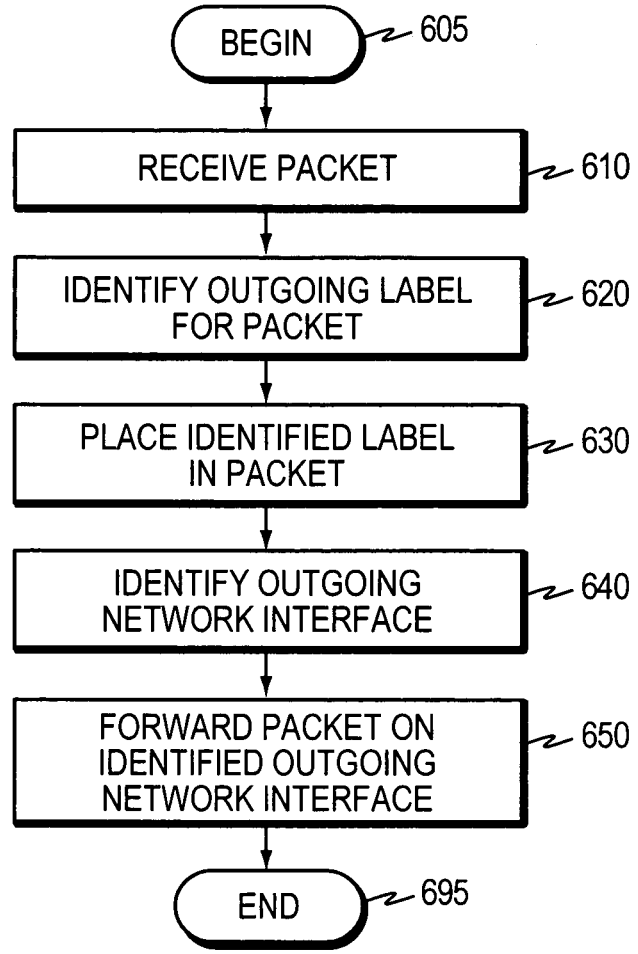
FIG. 6 is a flow chart of a sequence of steps that may be used to process an MPLS packet in accordance with an aspect of the present invention.

FIG. 6 is a flowchart of a sequence of steps that may be used to process an MPLS packet 400 in accordance with an aspect of the present invention. The sequence begins at step 605 and proceeds to step 610 where the MPLS packet 400 is received from the network. Next, at step 620, the intermediate node 200 identifies an outgoing label for the packet 400, as described above. At step 630, the identified outgoing label is placed at the top of the packet's label stack 440, as described above. At step 640 the outgoing network interface for the packet 400 is identified, as described above. At step 650, the packet is forwarded onto the network 100 via the identified network interface to its next hop in the network 100. The sequence ends at step 695.

For example, referring to FIGS. 1 and 6, assume that a non-IP data packet is to be sent from frame relay device 130a to frame relay device 130b on an LSP extending from edge node 140a to edge node 140b. Further assume, the LSP is associated with an FEC that causes MPLS packets 400 transferred on the LSP to be forwarded in accordance with aspects of the present invention.

Frame relay device 130*a* forwards the packet onto network 100 and the packet is received by edge node 140*a*. Edge node 140*a* packages the packet as an MPLS packet 400 and forwards the packet on the LSP towards node 140*b*. Specifically, edge node 140*a* places an MPLS label entry 420 in the packet's stack 440 that contains a label 422 that is associated with the FEC of the LSP in a conventional manner. The edge node 140 then forwards the packet 400 to intermediate node 200*a*.

Intermediate node 200*a* receives the MPLS packet 400 from the network 100 at a port 205 (step 610). The packet is associated with the port's network interface and forwarded via the backplane 220 to the supervisor engine 300. Interface logic 360 receives the packet 400 and places it in packet buffer 350. The processor 320 accesses the packet via system controller 330 and identifies an outgoing label for the packet, as described above (step 620). The processor 320 then places the identified outgoing label in the packet's label stack 440, as described above (step 630) and identifies an outgoing network interface that is to transfer the packet onto the network using a label 422 contained in the packet's label stack 440 (step 640). The label lookup provides semantics of the type of FEC associated with the packet. This in turn, influences the ECMP treatment of the packet.

Note that the packet may be forwarded on a network interface that transfers the packet to intermediate node 200*b* or on a network interface that transfers the packet to intermediate node 200*c*. Intermediate node 200*a* illustratively chooses the interface to carry the packet 400 to its next hop (i.e., either node 200*b* or node 200*c*) by hashing a label 422 contained in the packet's label stack 440 to generate a hash value and using the hash value to choose between the interface to node 200*b* or the interface to node 200*c*, as described above.

Assume that the network interface to node 200*b* is chosen. The packet 400 is then forwarded to the chosen network interface which forwards the packet 400 to intermediate node 200*b* via a port 205 (step 650). Specifically, the processor 320 directs the interface logic 360 to transfer the packet 400 via the backplane 220 to a line card 210 associated with the network interface. The line card 210 places the packet 400 onto the network 100 using a port 205 associated with the network interface.

The packet 400 travels to node 200*b* which receives the packet 400, processes it as described above and forwards it to node 200*d*. Node 200*d* receives the packet 400 and processes it as described above and forwards it to node 140*b*. Node 140*b* receives the packet 400 and forwards the packet to frame relay device 130*b*. Eventually device 130*b* receives the packet and processes it, accordingly.

It should be noted that the above description describes the MPLS packets as being processed by the supervisor engine 300. This is not intended to be a limitation of the invention. In other embodiments of the invention, the above described processing occurs on the line cards 210 or some combination of the network interfaces 210 and the supervisor engine. Here, the line cards 210 may contain the LFIB 500 and processing logic that is configured to process label switched packets in accordance with aspects of the present invention. For example, the processing logic may be configured to identify an outgoing interface (e.g., a port 205) and outgoing label for a label switched packet, as described above. In addition, the processing logic may be configured to place the identified outgoing label in the label switch packet as well as forward the packet to the identified outgoing interface, as described above.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for forwarding data packets in a communication network, the method comprising:
   receiving, at a node in the communication network, a data packet containing a label stack having one or more labels for switching the data packet on a path in the communication network, wherein the node includes a plurality of outgoing network interfaces for use in forwarding the data packet to one of a plurality of destination nodes;
   selecting, based on a forwarding equivalence class (FEC) associated with one or more of the labels contained in the label stack, an Equal Cost Multiple Path (ECMP) technique from among a plurality of ECMP techniques for use in identifying a selected outgoing network interface on the node for use in forwarding the data packet to a selected destination node;
   using the selected ECMP technique to identify the selected outgoing network interface for use in forwarding the data packet to a selected destination node based on information contained in a portion of the data packet other than a payload portion, wherein using further comprises:
      hashing one or more of the labels contained in the label stack to produce a hash value, wherein the one or more labels used to produce the hash value includes a label at the bottom of the label stack, and
      identifying the selected outgoing network interface using the hash value; and
   forwarding the data packet to the selected destination node using the selected outgoing network interface.

2. The method as defined in claim 1 further comprising:
   using the hash value to identify an outgoing label for the data packet; and
   placing the outgoing label in the label stack.

3. The method as defined in claim 1 further comprising:
   looking up an entry associated with the data packet in a label forwarding information base (LFIB) having one or more entries each associated with a plurality of outgoing network interfaces; and
   using the hash value to identify the selected outgoing network interface from the plurality of outgoing network interfaces associated with the entry.

4. The method as defined in claim 1 further comprising:
   establishing the selected ECMP technique by semantics of the FEC associated with the one or more labels used to select the ECMP technique.

5. The method as defined in claim 4 wherein the selected ECMP technique is used to identify the selected outgoing network interface from information contained in a portion of the data packet other than a payload portion.

6. The method as defined in claim 1 wherein the data packet is a Multiprotocol Label Switching (MPLS) data packet and the one or more labels in the label stack are MPLS labels.

7. An intermediate node in a communication network comprising:
   a network interface configured to receive a data packet containing a label stack having one or more labels for switching the data packet on a path in the communication network; a plurality of outgoing network interfaces for use in use in forwarding the data packet to one of a plurality of destination nodes;

processing logic configured to:
- (a) select, based on a forwarding equivalence class (FEC) associated with one or more of the labels contained in the label stack, an Equal Cost Multiple Path (ECMP) technique from among a plurality of ECMP techniques for use in identifying a selected outgoing network interface on the node for use in forwarding the data packet to a selected destination node based,
- (b) use the selected ECMP technique to identify the selected outgoing network interface for use in forwarding the data packet to a selected destination node based on information contained in a portion of the data packet other than a payload portion, wherein use of the selected ECMP technique further comprises:
  - hash one or more of the labels contained in the label stack to produce a hash value, wherein the one or more labels used to produce the hash value includes a label at the bottom of the label stack, and
  - identify the selected outgoing network interface using the hash value, and
- (c) forward the data packet on the selected destination node using the selected outgoing network interface.

8. The intermediate node as defined in claim 7 wherein the processing logic is further configured to:
- (a) use the hash value to identify an outgoing label for the data packet, and
- (b) place the outgoing label in the label stack.

9. The intermediate node as defined in claim 7 further comprising:
- a label forwarding information base (LFIB) having one or more entries each associated with a plurality of outgoing network interfaces, and
- wherein the processing logic is further configured to:
  - (a) lookup up an entry in the LFIB associated with the data packet, and
  - (b) use the hash value to identify the selected outgoing network interface from the plurality of outgoing network interfaces associated with the entry.

10. The intermediate node as defined in claim 7 wherein the processing logic is further configured to:
- establish the ECMP technique by semantics of the FEC associated with the one or more labels used to select the ECMP technique.

11. The intermediate node as defined in claim 10 wherein the selected ECMP technique is used to identify the selected outgoing network interface from information contained in a portion of the data packet other than a payload portion.

12. An apparatus in a communication network comprising:
- means for receiving, at a node in the communication network, a data packet containing a label stack having one or more labels for switching the data packet on a path in the communication network, wherein the node includes a plurality of outgoing network interfaces for use in forwarding the data packet to one of a plurality of destination nodes;
- means for selecting, based on a forwarding equivalence class (FEC) associated with one or more of the labels contained in the label stack, an Equal Cost Multiple Path (ECMP) technique from among a plurality of ECMP techniques for use in identifying a selected outgoing network interface on the node for use in forwarding the data packet to a selected destination node;
- means for using the selected ECMP technique to identify the selected outgoing network interface for use in forwarding the data packet to a selected destination node based on information contained in a portion of the data packet other than a payload portion, wherein the means for using further comprise:
  - means for hashing one or more of the labels contained in the label stack to produce a hash value wherein the one or more labels used to produce the hash value includes a label at the bottom of the label stack, and
  - means for identifying the selected outgoing network interface using the hash value; and
- means for forwarding the data packet to the selected destination node using the selected outgoing network interface.

13. The apparatus as defined in claim 12 further comprising:
- means for looking up an entry associated with the data packet in a label forwarding information base (LFIB) having one or more entries each associated with a plurality of outgoing network interfaces; and
- means for using the hash value to identify the selected outgoing network interface from the plurality of outgoing network interfaces associated with the entry.

* * * * *